Oct. 24, 1933.　　　A. URFER　　　1,932,329
ELECTRICAL APPARATUS
Filed July 24, 1930　　　2 Sheets-Sheet 1

INVENTOR
Adolf Urfer.
BY F. B. Smith
ATTORNEY

Oct. 24, 1933.    A. URFER    1,932,329
ELECTRICAL APPARATUS
Filed July 24, 1930    2 Sheets-Sheet 2
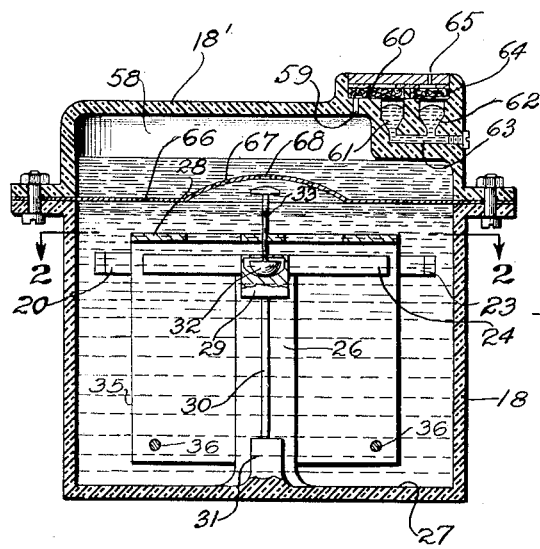
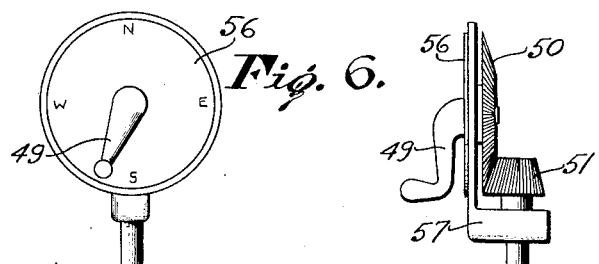
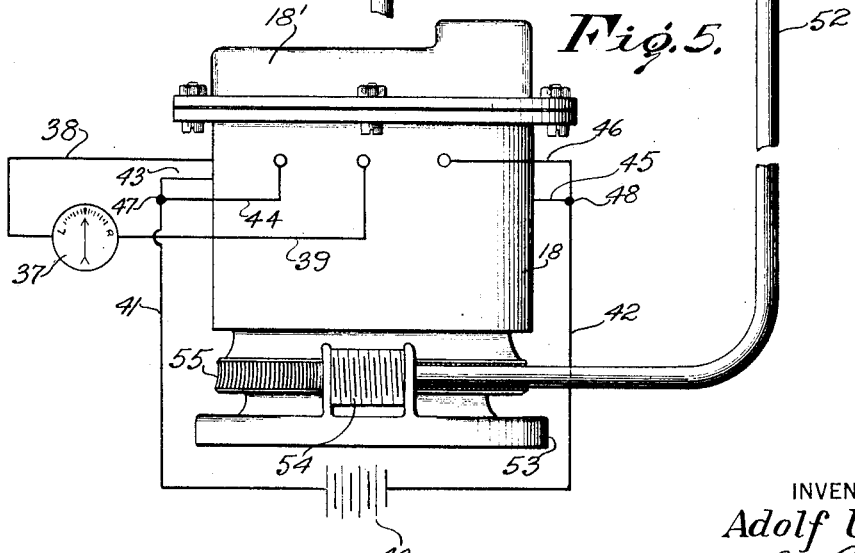
INVENTOR
Adolf Urfer.
BY
ATTORNEY Patented Oct. 24, 1933

1,932,329

UNITED STATES PATENT OFFICE 1,932,329

ELECTRICAL APPARATUS

Adolf Urfer, Richmond Hill, N. Y., assignor to Pioneer Instrument Company, Incorporated, Brooklyn, N. Y., a corporation of New York Application July 24, 1930. Serial No. 470,451

5 Claims. (Cl. 33—204)

The present invention relates to improvements in electrical apparatus, and more particularly to means for use in indicating relative angular movements between objects.

One of the objects of the invention is to provide novel means for indicating the deviation of a mobile object, such as a ship or aircraft, from a selected path or course.

Another object is to provide a novel electrolytic control system which is so designed as to depend for operation upon changes in the electrolytic resistance of an electrical circuit or circuits due to changes in the length of the electrolytic paths of said circuits.

Another object is to provide novel electrical apparatus of the above-mentioned type for varying the resistance of an electrolytic circuit or circuits whereby the use of movable conductors is rendered unnecessary.

Another object is to provide novel means in combination with a plurality of electrical circuits whereby one of said circuits is rendered relatively ineffective and others effective due to relative angular movement between certain of the elements of said means.

A further object is to provide novel electrical apparatus of the above-mentioned type in combination with a pair of electrical circuits whereby the electrolytic resistance of one of said circuits is increased while that of the other is decreased due to relative angular movement between certain of the elements of said apparatus.

Another object is to provide, in combination with a directional or controlling device such as a magnetic compass, novel electrical means for indicating differences in the relative angular position between the directional device and a mobile object, such as a ship or aircraft, on which said device is mounted.

Still another object of the invention is to provide, in combination with a magnetic compass, novel electrical means including an indicator or indicators located at a distance from said compass for indicating relative angular movement between the magnetic elements of the compass and the mobile object on which said compass is mounted.

A still further object is to provide, in combination with a compass and novel electrical control apparatus therefor, means for predetermining and setting a course to be followed by the mobile object on which said compass is mounted and for indicating at a convenient point or points, which latter may be at a distance from the compass, angular deviations of said mobile object from the predetermined or selected course.

Other objects and advantages of the invention will appear more fully hereinafter from the following description taken together with the accompanying drawings which illustrate one embodiment of the invention. It is to be expressly understood, however, that the drawings are for purposes of illustration and description only, and are not designed as a definition of the limits of the invention, reference being had for this purpose to the appended claims.

In the drawings, wherein like reference characters refer to like parts throughout the several views, Fig. 1 is a schematic circuit diagram illustrating certain principles of operation of the invention;

Fig. 4 is a vertical section taken along the line 4—4 of Fig. 2;

Fig. 5 is an elevational view, partially diagrammatic, of one form of course-setting mechanism together with the control device and deviation indicator; and Fig. 6 is a front elevation of a portion of the course-setting mechanism shown in Fig. 5.

Figure 1:
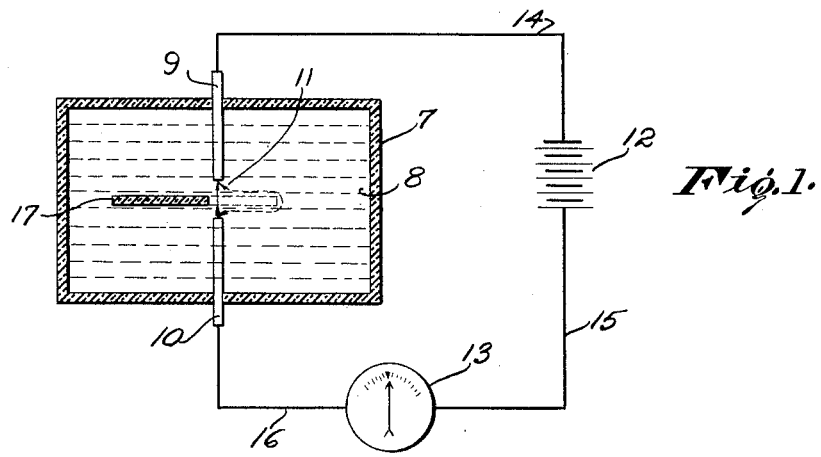

It is known that in an electrical circuit which includes a pair of electrodes immersed in an electrolyte, the electrolytic resistance of the circuit may be varied by changing the path length between the conductors or electrodes. In Fig. 1 there is illustrated novel means for varying the length of the electrical path between a pair of electrodes whereby the resistance of the circuit which includes said electrodes is varied. As shown, 7 is a container of some suitable insulating material having an electrolyte 8 therein, the latter, for example, being composed of distilled water slightly acidulated with hydrochloric acid or any other suitable acid. Projecting through container 7 and into the electrolyte 8 are a pair of electrodes 9 and 10 arranged in spaced relation so that an electrolytic path 11 is formed between their adjacent ends. The electrodes 9 and 10 are preferably non-metallic and arranged in series with a source of current 12 and a suitable indicating instrument 13, such as a galvanometer or an ammeter, by means of the wires 14, 15, and 16. Now if an insulator as indicated at 17 be interposed between the adjacent ends of the conductors or electrodes 9 and 10, the electrolytic path 11 will be increased as indicated by the dotted lines, thereby increasing the electrolytic resistance of the series circuit containing electrolyte, conductors or electrodes, the soure 12, and the indicating device 13 and causing a deflection of the latter.

Figure 2:
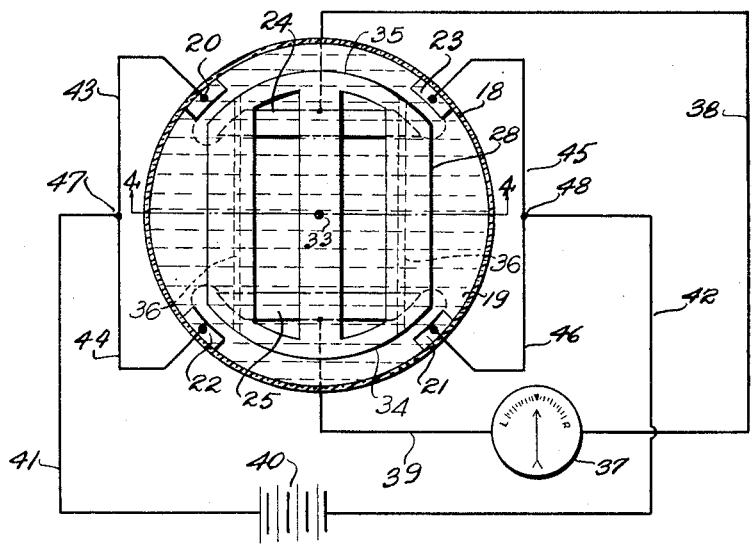
Fig. 2 is a partially diagrammatic sectional plan view of one embodiment of the invention taken along line 2—2 of Fig. 4.

In the form shown in Figs. 2, 4, and 5, the invention may be embodied in a compass bowl 18 of some suitable insulating material such as glass, porcelain, or hard rubber, preferably the latter, and having an electrolyte 19 therein. A plurality of conductors or electrodes 20, 21, 22, 23 are carried by the compass bowl and are fixed or rigidly secured to the wall thereof in any suitable manner and arranged so that each pair, as 20 and 21, are arranged in diametrically opposed relation as indicated. Another set of conductors or electrodes 24 and 25 are provided and arranged so that each extends between a pair of circumferentially arranged conductors or electrodes, each pair consisting of one of each of the diametrically opposed conductors. The conductors or electrodes 24 and 25 are spaced at a distance from each other in the container 18 and each is carried by a pedestal or projection 26 extending upward from the bottom 27 of said container as indicated in Fig. 4. All of the electrodes or conductors may be of any suitable conducting material, preferably non-metallic, as for example carbon, graphite or some other allotropic form of carbon so that deterioration of said electrodes by electrolysis or electro-plating action is eliminated and the evolution of gases reduced.

Figure 3:
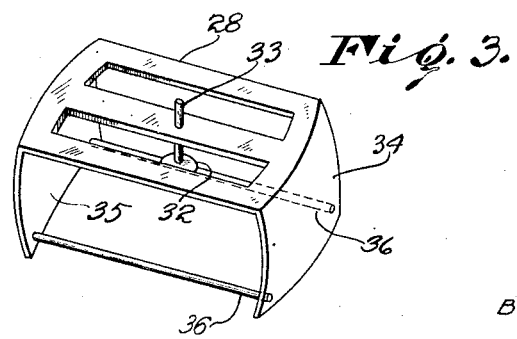
Fig. 3 is a perspective view of one of the control elements of the apparatus.

A member 28, which may be of any suitable insulating material such as oiled or waxed paper and having a somewhat box-like form for example, as shown in Fig. 3, is mounted in the center of the container for angular movement by means of a pivotal bearing 29 carried by a rod 30 mounted in a boss 31 projecting upward from the center of the bottom 27 of the container. Member 28 is adapted for universal movement by means of a hemispheric member 32, the member 28 being secured thereto by means of a pin 33. Member 28 is provided with downwardly projecting depending curved flanges or portions 34 and 35 which are interposed between conductor 24 and conductors 20, 23, and conductor 25 and conductors 22, 21 when the member is mounted in position. Directional elements or magnetic needles 36 extend longitudinally between the depending flanges 34 and 35 and are carried thereby at the lower ends thereof so as to be remote from the several conductors or electrodes, as indicated in Fig. 3.

It will be apparent that the magnetic needles 36 will tend to remain in a north—south position relative to the earth's magnetic field, so that the electrolytic paths remain substantially constant, but when relative angular movement takes place between the insulator member 28 carrying said needles and the conductors or electrodes 20, 23, and 24, and the conductors or electrodes 21, 22, and 25, the electrolytic paths will be varied between the conductors or electrodes 20 and 24, 23 and 24, 21 and 25, and 22 and 25.

Means are provided for indicating the relative angular movement between the insulator member 28 and the fixed conductors or electrodes in accordance with the variation of the electrolytic paths above mentioned. This means comprises an indicator 37, which may be a galvanometer or any other suitable electrical indicating instrument, connected to the electrodes 24 and 25 by means of conductor leads 38 and 39, respectively. The source of electric current 40 is connected to the circumferentially arranged electrodes by means of conductor leads 41 and 42, and current from said source is divided so that part of it flows to electrode 20 through the lead 43, and part to electrode 22 through the lead 44. Current returns to the source from conductor 23 through lead 45, and from conductor 21 through lead 46 as indicated in Fig. 2.

It will be apparent from this circuit arrangement that the current from source 40 flows through lead 41, dividing at the junction point 47, part of it going through lead 43 to conductor 20 through the electrolyte 19 to the electrode 24, and from the electrode 24 through the electrolyte to the conductor or electrode 23 to the junction point 48. The other part of the current flows through lead 44 to electrode 22, through the electrolyte to electrode 25, from electrode 25 through the electrolyte to electrode 21, and through lead 46 to the junction point 48, where both portions combine and return to the source through lead 42. When the insulator 28 is in the position indicated in Fig. 2 the electrolytic paths between conductors 20—24, 24—23, 21—25, and 25—22 are substantially equal and consequently the electrolytic resistances of the circuits are equal, thereby producing no current flow through the leads 38 and 39 to the indicating device 37. However, when there is an angular displacement of the insulator 28 to the left, for example, which may be produced by moving the bowl 18 to the right, then the electrolytic paths between electrodes 20 and 24 and electrodes 21 and 25 is increased and the electrolytic paths between electrodes 23 and 24 and electrodes 22 and 25 is decreased, thereby increasing and decreasing the resistance of said paths, respectively. Therefore, the current from source 40 will now flow from the junction point 47 through lead 44 to electrode 22, through the low resistance electrolytic path to electrode 25, and will not flow from electrode 25 to electrode 21 because of the latter path being of high resistance, and will flow instead through lead 39 through the indicating device 37, lead 38, electrode 24, and here again the current will not flow from electrode 24 to electrode 20 because of the high resistance of the path therebetween, and will take its path from electrode 24 through the low resistance path to electrode 23, lead 45, and lead 42 back to the source.

If displacement of the insulating member 28 is in the reverse direction, the electrolytic paths of conductors 22 and 23 will be increased and the paths of conductors 20 and 21 will be decreased, thereby increasing and decreasing the resistance of said paths, respectively, and current from source 40 will then flow from junction point 47 through lead 43 to electrode 20, through the electrolytic path to the electrode 24, through lead 38, through the indicating device in a direction opposite to that of the current flow in the previous instance, through lead 39, conductor 25, electrode 21 to the junction 48, and returning to the source via the lead 42. Therefore, if the compass bowl 18 be carried by a mobile object, such as a ship or aircraft, it will be seen that when the mobile object veers to the left the indicator 37 will give a "left" indication, and when it veers to the right the indicator will give a "right" indication.

There is thus provided a novel means for indicating the deviation of a mobile object from a set path or course. Course-setting mechanism is also provided for predetermining and setting a selected course to be followed by the mobile object on which the bowl 18 is mounted. As shown in Fig. 5, this mechanism includes a crank 49 connected to a bevel gear 50 so that the gear may be rotated thereby. A pinion 51 is arranged to mesh with the gear 50 and to actuate a flexible shaft 52 which extends to the base 53 of the bowl 18 and is provided with a worm 54. The latter meshes with a worm gear 55 carried by the base of the rotatable bowl 18. Cooperating with crank 49 is a stationary dial 56 attached to the bracket 57 which is adapted to be mounted on the instrument panel adjacent the indicating device 37, the latter being connected to the various conductors in the bowl 18 as hereinbefore explained.

Fig. 6 illustrates the front elevation of the dial 56, and is marked with the cardinal points of the compass and further sub-divided into intermediate divisions representing degrees from zero to 360.

When it is desired, for example, to pilot the ship or aircraft carrying the apparatus on a set course, the crank 49 is rotated to the marking on the dial 56 representing the desired course, which simultaneously rotates the bowl 18 by means of the flexible shaft 52. The rotation of bowl 18 will be indicated on the device 37 by means of its pointer, and now the mobile object may be steered to the selected course until the pointer is in the center of its scale, indicating that the ship or aircraft is on the course, as hereinbefore explained. Any deviation from said course will produce a corresponding deviation on the indicator 37.

When a direct current passes through an electrolyte a slight ionization thereof takes place, producing gases, but if the current used be reduced to a minimum, and non-metallic electrodes provided, as hereinbefore mentioned, the evolution of gases will be relatively small. However, over extended periods of time gases may accumulate and produce a slight pressure which might affect the operation of the apparatus of the invention and, therefore, to eliminate such possibilities there is provided a vent or gas escape and pressure relief valve for the container or bowl 18 which, in the form shown in Fig. 4, comprises a mercury seal arranged in the cover 18' of the bowl. The cover 18' also provides an expansion chamber 58 for the container.

When a pressure is reached in the chamber 58 above the outside pressure, the gas accumulated in said chamber will pass through opening 59 into a small chamber 60, which contains some glass wool, and will bubble through mercury contained in passages 61 and 62, the latter communicating with each other through a passage 63. From passage 62 the gas passes through another small passage 64 containing glass wool and finally out to the atmosphere through a vent 65. There is thus provided a check and relief valve which permits the release of gases when the gas pressure increases above the pressure of the atmosphere outside of the container but which prevents air from entering or passing into the container. Glass wool is used in the venting passages 60 and 64 because it is non-hygroscopic, i. e., does not produce any capillary attraction for the mercury and thereby prevents the latter from passing therethrough.

A baffle plate 66 is provided and clamped between the container 18 and the cover 18' as indicated in Fig. 4, for preventing the existence of a free surface of the liquid in the container in the vicinity of the horizontal portion of the insulator member 28, thereby eliminating splashing of the liquid which would produce undesirable movements of said insulator member. As shown, the liquid extends up into the cover 18' above the baffle plate 66. The latter has a circular raised portion 67 to provide a clearance for the pin 33. Aperture 68 in said raised portion permits any gases evolved from the electrolyte to escape into chamber 58.

From the foregoing description it will be seen that novel means are provided in combination with a magnetic compass for accurately and effectively repeating relative angular movements between a mobile object and the directional elements of the compass, thereby enabling the pilot or navigator of said mobile object, which may be a ship or aircraft, to quickly perceive, at a point or points which may, if desired, be located at a distance from the compass, whether he is on or off his course and to pilot the craft accordingly. The device is quite simple and easily constructed, thereby reducing the cost of manufacture, and yet is rugged enough to withstand hard use under the trying conditions generally encountered in aerial navigation, for example, without sacrificing or decreasing the efficiency of the device. The magnetic compass may be mounted in any convenient location on a ship or aircraft, while the indicator or repeater which is operated thereby may be conveniently mounted on the instrument panel in the cockpit of an aircraft or on the bridge of a vessel, etc. Various changes and modifications may be made in the apparatus without departing from the scope of the invention, as for example, a compass card may be mounted on top of the insulator member 28 and the top of the cover 18' may then be made of glass or other suitable transparent material for observing the card, thereby providing means for giving a direct indication of the selected course if desired, particularly in checking the apparatus with another compass. The supporting member 28 may be given various forms. Reference will be held to the appended claims for a definition of the limits of the invention.

What is claimed is:

1. Electrical apparatus of the class described comprising a container having an electrolyte therein, a plurality of fixed electrodes carried by said container and in contact with said electrolyte and arranged to form a plurality of electrolytic paths therebetween, a source of electric current, a pair of electrical circuits each of which includes said electrolyte, said source and certain of said electrodes, means common to both circuits for indicating the current flowing therethrough, and an insulating member pivotally mounted in said container and having depending portions respectively interposed between the fixed electrodes of each circuit for angular movement relative to said electrodes for varying said electrolytic paths whereby the electrolytic resistance of said circuits is varied to cause the current through said indicating means to flow in one direction or in an opposite direction depending upon the relative angular movement between the conductors and said insulating member being in one direction or in an opposite direction.

2. In electrical apparatus of the class described, a pair of parallel electrical circuits each of which includes a plurality of stationary electrodes and a common electrolyte, certain of said electrodes being common to both circuits and forming electrolytic paths with the other electrodes, an insulating member having depending portions arranged to pass respectively between each of the common electrodes and the other of said electrodes of each circuit whereby, upon relative angular movement between said insulating member and electrodes, the length of the electrolytic path of either of said circuits may be increased while that of the other is decreased.

3. In apparatus including an electro-responsive device for causing the reproduction, at a remote point, of displacement movements between a mobile object and a directional element carried thereby to indicate when said object is off a selected course, the combination with said directional element and said electro-responsive device, of a container for said element having an electrolyte therein, a plurality of fixed electrodes carried by said container and in contact with said electrolyte and arranged to form a plurality of electrolytic paths therebetween, a source of electric current connected to said electrodes in such a manner as to constitute a Wheatstone bridge circuit therewith, the arms of which are constituted by the electrolytic paths and to which the electro-responsive device is connected, a pivotally mounted insulating member carrying said directional element and having depending portions arranged to pass between the electrodes to vary the lengths of each of the electrolytic paths between the electrodes whereby said Wheatstone bridge becomes unbalanced upon relative angular movement between said directional element and the mobile object to cause current to flow through said electro-responsive device in one direction or another, means controlled from the remote point for rotating said container whereby a desired course may be selected, and means operatively associated with said course selecting means for indicating the selected course.

4. In apparatus including an electro-responsive device for causing the reproduction, at a remote point, of displacement movements between a mobile object and a directional element carried thereby, the combination with said directional element and said electro-responsive device, of a container for said element having an electrolyte therein, a plurality of fixed electrodes carried by said container and in contact with said electrolyte and arranged to form a plurality of electrolytic paths therebetween, a source of electric current connected to said electrodes in such a manner as to constitute a Wheatstone bridge circuit therewith, the arms of which are constituted by the electrolytic paths and to which the electro-responsive device is connected, a pivotally mounted insulating member carrying said directional element and having depending portions arranged to pass between the electrodes to vary the lengths of each of the electrolytic paths between the electrodes whereby said Wheatstone bridge becomes unbalanced upon relative angular movement between said directional element and the mobile object to cause current to flow through said electro-responsive device in one direction or another.

5. In apparatus including an electro-responsive device for causing the reproduction, at a remote point, of displacement movements between a mobile object and a directional element carried thereby, the combination with said directional element and said electro-responsive device, of a transmitter comprising a container for said directional element having an electrolyte therein, two pairs of fixed electrodes carried by said container and in contact with said electrolyte, the electrodes of each pair being connected together and each pair connected in series with a source of electric current, two other fixed electrodes carried by said container in said electrolyte and arranged so that each of them is respectively interposed between one electrode of one pair and one electrode of another pair of the first-mentioned electrodes to form electrolytic paths between the latter and the two last-named electrodes, said electrolytic paths constituting the arms of a Wheatstone bridge the point of zero potential of which is at the last two named electrodes, a pivotally mounted insulating member carrying said directional element and having portions arranged to pass between the electrodes to vary the lengths of each of the electrolytic paths between the electrodes whereby, for a given direction of deviation, the resistance of one arm of the Wheatstone bridge is increased while the resistance of the other arm is decreased to unbalance the bridge upon relative angular movement between said directional element and the mobile object to cause current to flow through said electro-responsive device in one direction or another.

ADOLF URFER.